Oct. 5, 1971 A. KURIS 3,610,080
ULTRASONIC METHOD AND APPARATUS FOR SHAVING
Filed Oct. 31, 1969 6 Sheets-Sheet 1
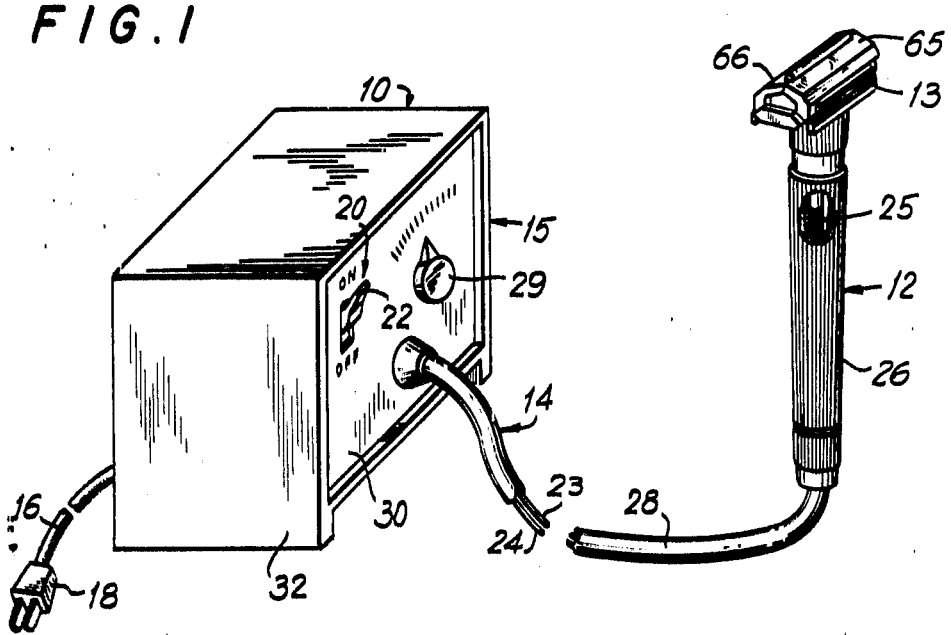
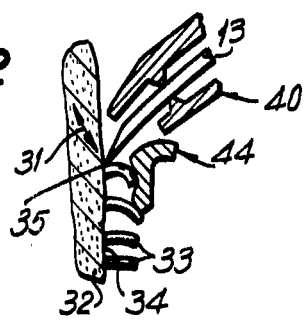
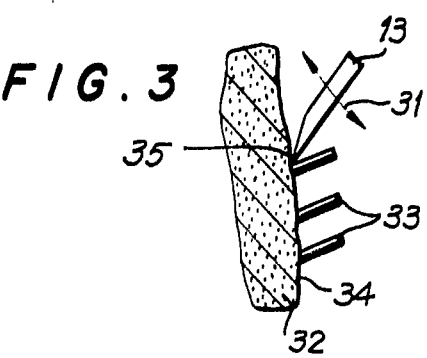
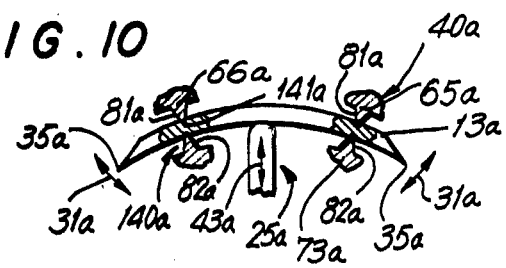
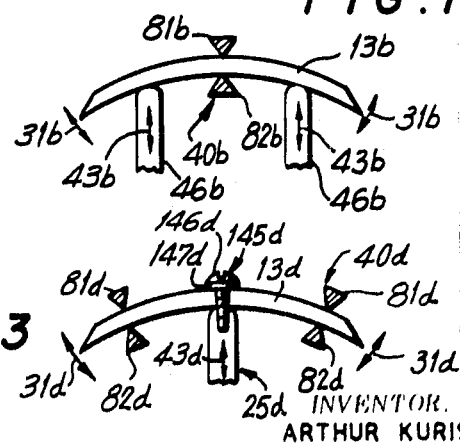
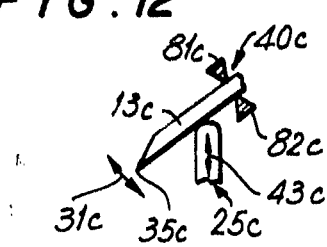
INVENTOR.
ARTHUR KURIS
BY
Leonard W. Suroff
ATTORNEY

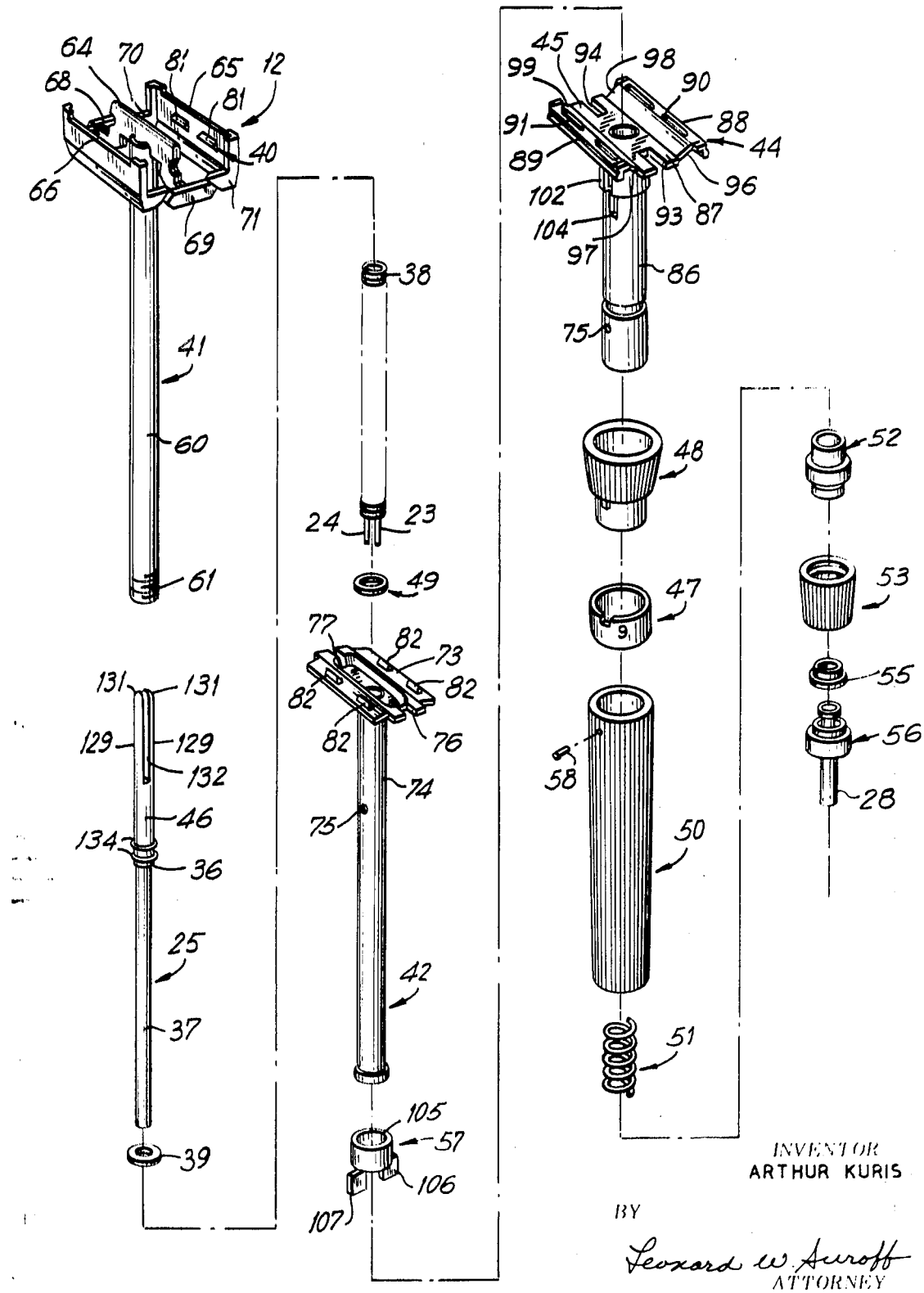

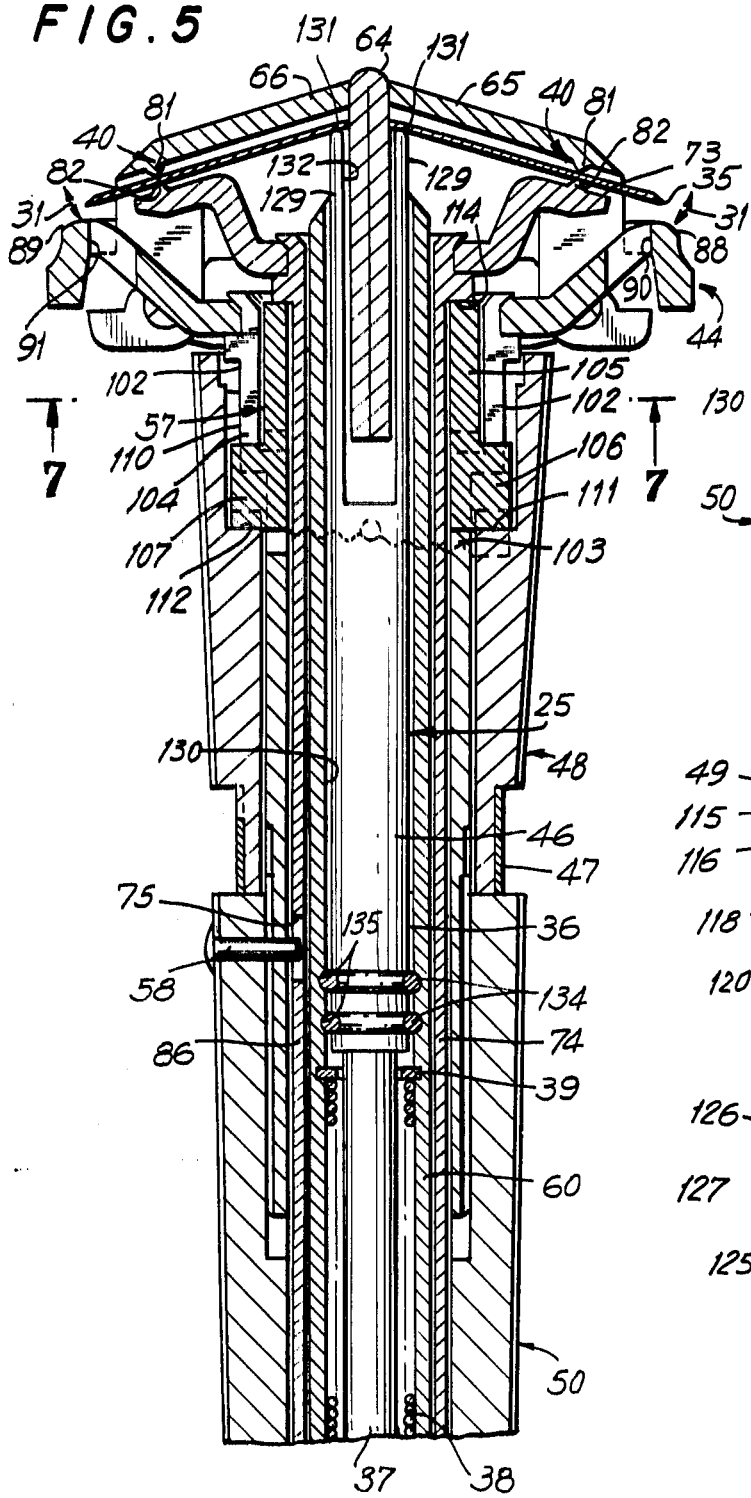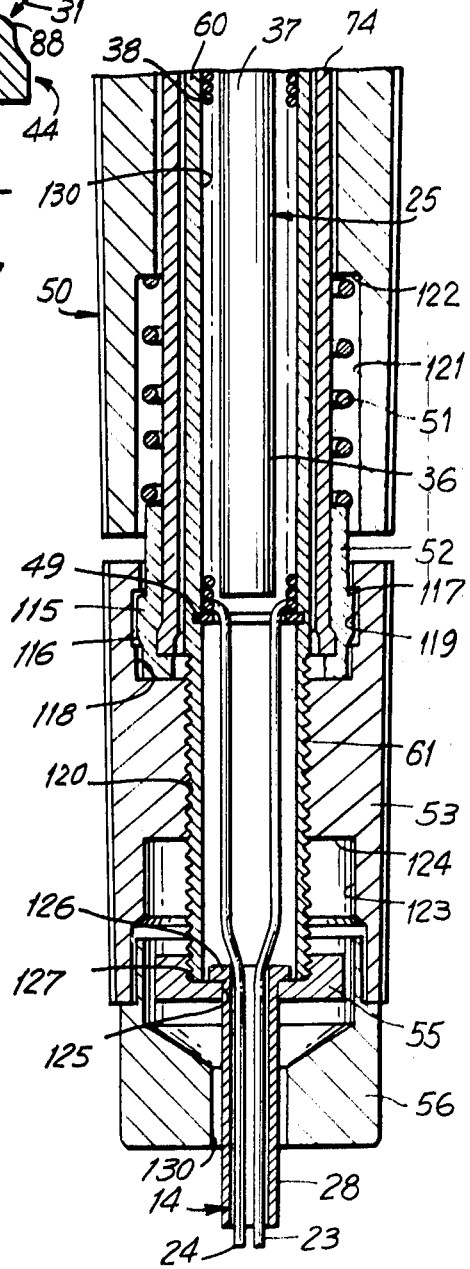

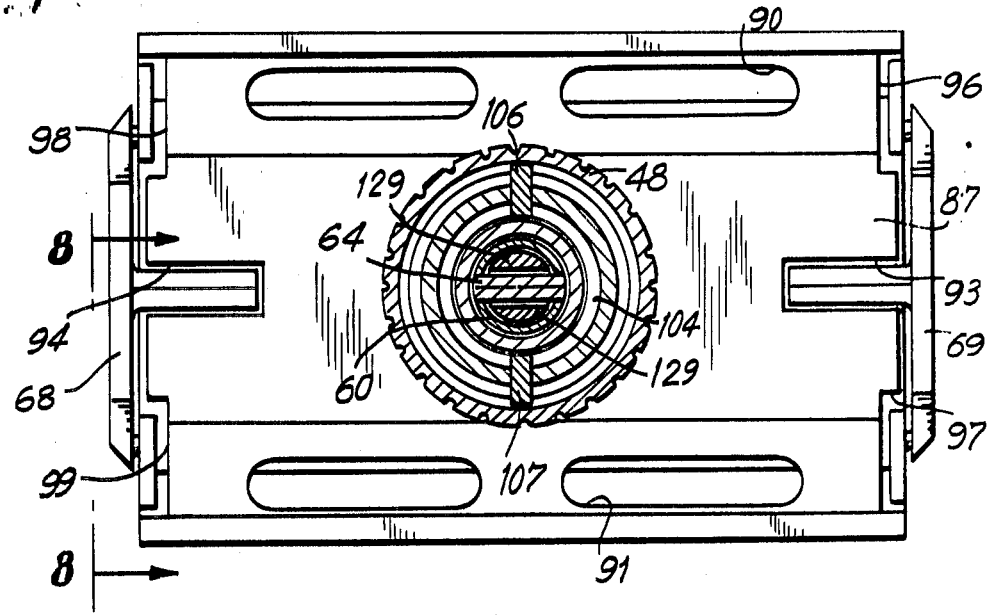
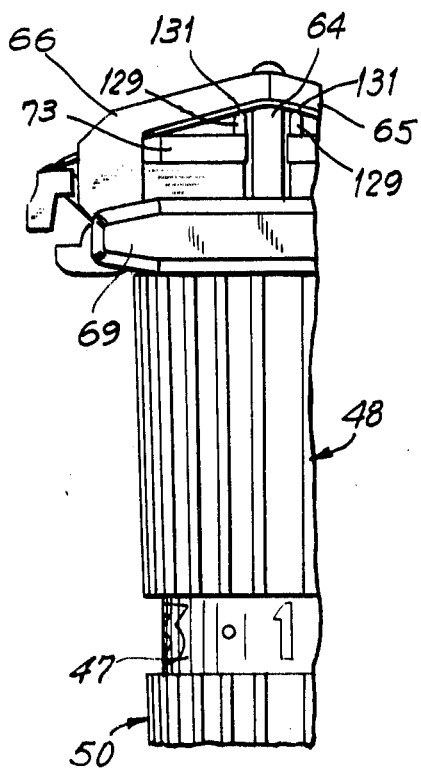
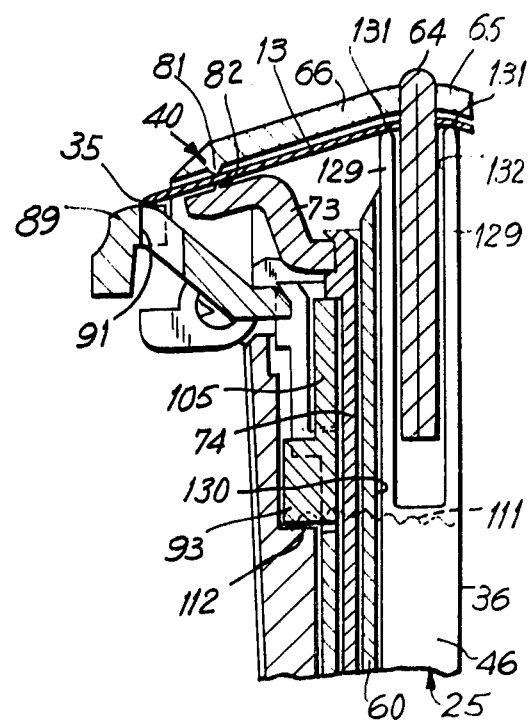

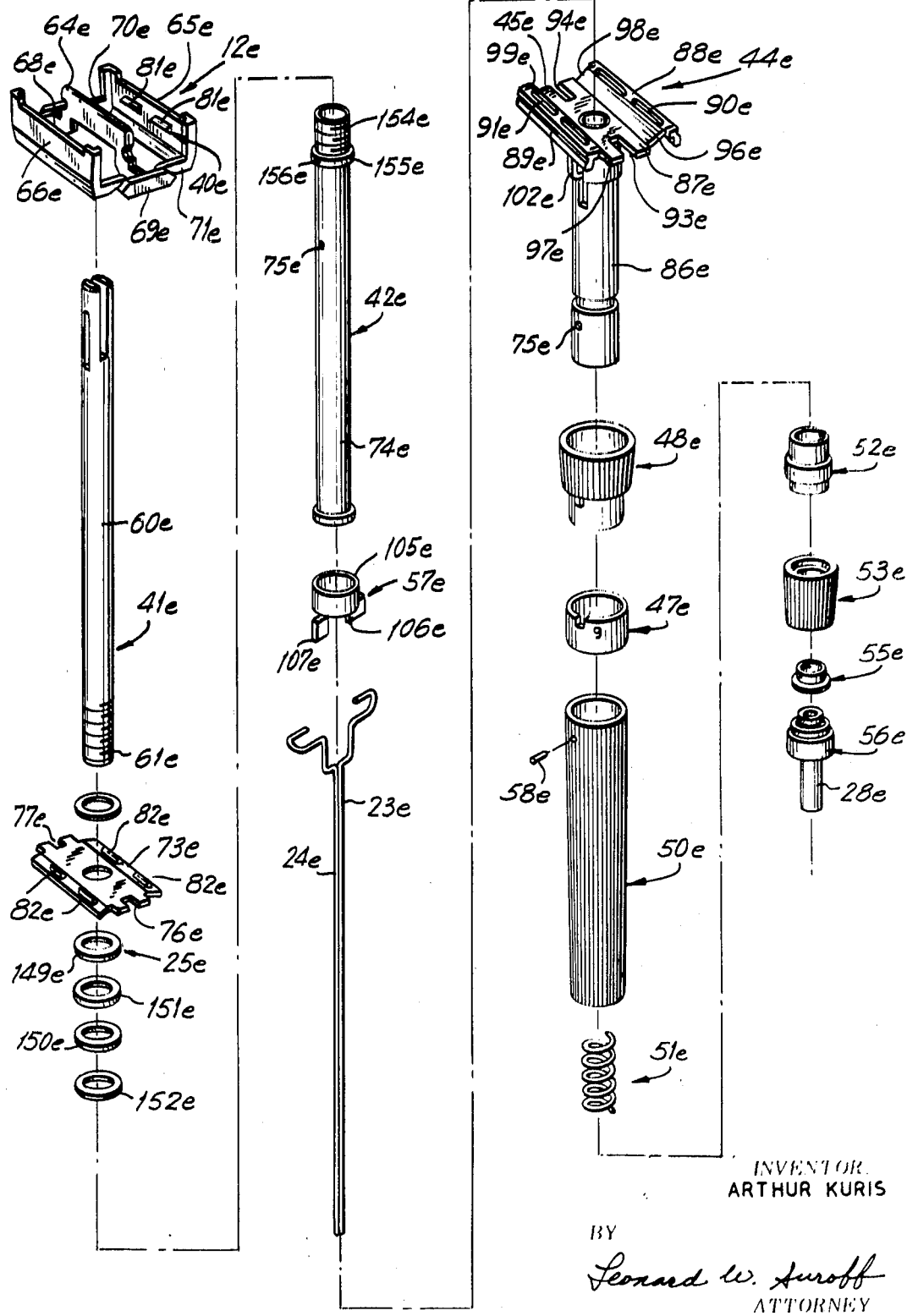

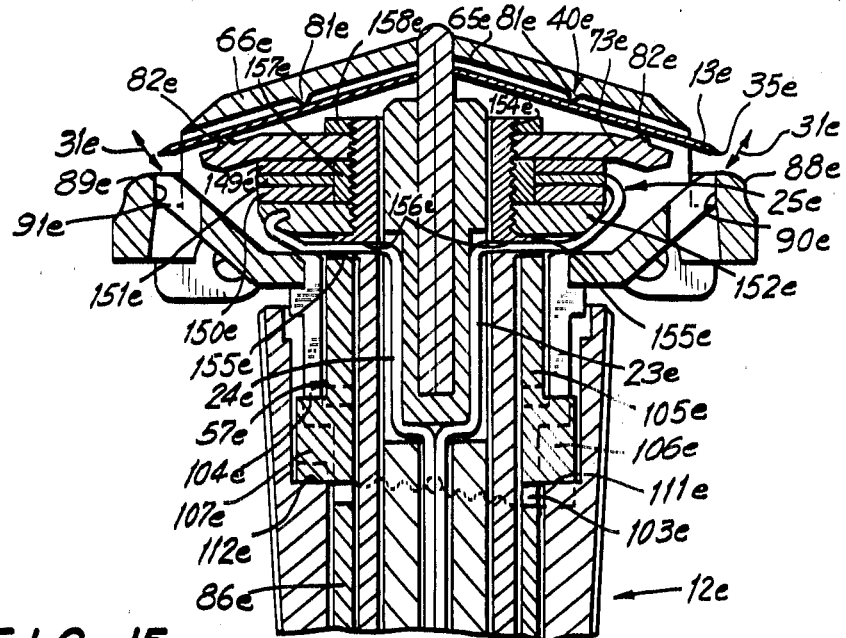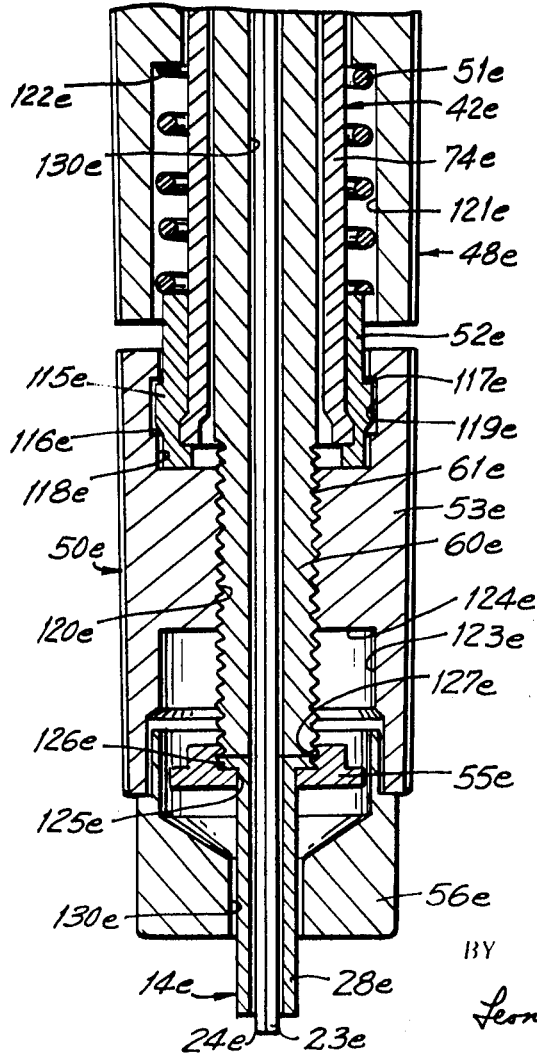

United States Patent Office
3,610,080
Patented Oct. 5, 1971

1

3,610,080
ULTRASONIC METHOD AND APPARATUS
FOR SHAVING
Arthur Kuris, Riverdale, N.Y., assignor to Ultrasonic
Systems, Inc., Farmingdale, N.Y.
Filed Oct. 31, 1969, Ser. No. 872,927
Int. Cl. B26b 21/38
U.S. Cl. 83—13                                   38 Claims

ABSTRACT OF THE DISCLOSURE

A shaving instrument having a cutting blade that is ultrasonically vibrated to substantially reduce the frictional resistance of the movement of the shaving instrument relative to the skin, and the method of shaving accordingly.

BACKGROUND OF THE INVENTION

This invention relates to methods and apparatus for shaving, and more particularly to methods and apparatus for personal shaving employing ultrasonic energy suitable for regular use in the home.

The process of shaving for humans has essentially remained unchanged for hundreds of years. Over the last several decades the single and double edge disposable blades or shaving members have been introduced and are now in almost universal use. In recent years mere mechanical variations and improvements, such as the safety razor with adjustment between the guard and cutting edge of the shaving member, have been the limit of improvement with respect to the mechanical instrumentation. More recently razor blades have been manufactured from stainless steel to provide a longer life to the cutting edge to increase the number of shaves per given blade before the cutting edge becomes sufficiently worn to cause discomfort and irritation to the user's skin. More recently attempts have been made to coat the cutting member with silicone and other materials in an attempt to reduce the coefficient of friction between the cutting edge and skin as it severs the hairs of the body.

In recent years, manually activated shaving instruments have in part been replaced by motor driven shaving devices. These implements take various forms, but all consist basically of an electric motor powered by battery or from a standard 60 cycle source, and a blade or cutting member which is driven by the motor. The motion imparted to the blade member may be rotary, longitudinal, or oscillatory, either in a longitudinal or transverse mode. In all of the devices of this type known to date, the movement of the blade member is effected at a rate of speed related to commercial power frequencies, i.e., 60 cycles per second, and the blade member may move on the order of from 60 to 120 times a second.

Such motor driven shaving instruments provide certain advantages over conventional manual shaving. Since a great many more cutting edges per second are provided by the powered device, substantially more cutting is performed by the user in a given amount of time. Also, since the motor provides the power necessary to move the cutting head in the prescribed manner, it is only necessary for the user to guide the blade over the skin surfaces being shaved to achieve proper results. These devices then are appealing in that they are relatively simple to use and also serve to provide what amounts to an increase

2 coverage of an area per unit time, as compared to conventional manual shaving.

However, the use of these conventional motor driven and manual shaving instruments does not overcome many objectionable aspects of shaving. Essentially to obtain an optimum shave there are two factors that are important, the first is that we have a minimal amount of frictional resistance between the shaving instrument and the skin as it is moved relative thereto, and the second is that the cutting edge of the blade be maintained as sharp as possible to facilitate the cutting of the hairs as the shaving instrument moves across the surface of the skin.

OBJECTS OF THE INVENTION

It is the general object of the present invention to avoid and overcome the objections to prior art practices by the provision of methods and apparatus employing ultrasonic energy for shaving which enables significantly better shaving of skin and which is completely safe for use in the home.

Another object of this invention is to provide novel and improved shaving techniques and apparatus for shaving giving clean shaves for various kinds of hair growths.

Another object of this invention is to provide novel forms of shaving apparatus and improved shaving techniques employing ultrasonic energy in which the frictional resistance to movement of the shaving instrument over the skin is substantially reduced.

Another object of this invention is to provide a novel and improved shaving technique and apparatus employing ultrasonic energy which may be employed with or without a shaving cream.

Another object of the present invention is to provide a novel form of shaving apparatus employing ultrasonic energy in which the razor or cutting member may be of conventional style commercially available.

SUMMARY OF THE INVENTION

The aforesaid objects of the present invention, and other objects which will become apparent as the description proceeds, are achieved by providing a series of features, steps and elements assembled and working together in inter-related combination to provide the shaving effects of the present invention. The present inventor has discovered that, when ultrasonic energy is applied to a razor or cutting member that an improved shave may be obtained without any damage to the skin.

Briefly, in accordance with the invention a cutting member, which includes one or more cutting edges, is vibrated at an ultrasonic rate and manually moved over the skin to be shaved under light pressure and with a minimal static force. Although not necessarily limited thereto, the combined ultrasonic and manual movement of the cutting member may be performed in the presence of a fluid, such as water, or a shaving cream. The unique properties displayed at the cutting edge of an ultrasonically vibrating cutting member such as a razor enable greatly improved cutting with a minimal of frictional interference.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof wherein like reference numerals refer to like parts throughout the several views and in which:

FIG. 1 is a perspective view of an ultrasonic shaving unit in accordance with the present invention;

FIGS. 2 and 3, are enlarged fragmentary sections helpful in explaining the operation of the present invention;

FIG. 4 is an exploded perspective view of one preferred form of ultrasonic razor of the present invention;

FIG. 5 is an enlarged cross-sectional view through the embodiment of FIG. 4, after assembly with a double edge razor blade clamped for shaving;

FIG. 6 is a fragmentary cross-sectional view through the lower portion of the handle of the embodiment of FIGS. 4 and 5;

FIG. 7 is a bottom plan view taken generally along the lines 7—7 of FIG. 5;

FIG. 8 is a fragmentary side elevational view taken generally along the lines 8—8 of FIG. 7, with the adjustment in position of minimum blade clearance;

FIG. 9 is a fragmentary cross-sectional view of the razor head with the blade in energy transmission relationship to the ultrasonic motor;

FIGS. 10–13 are diagrammatic views of alternate means for mounting the blade and coupling the ultrasonic energy thereto;

FIG. 14 is a view similar to FIG. 4, but illustrating another embodiment in which a piezoelectric ultrasonic motor is used; and FIG. 15 is an enlarged cross sectional view of the embodiment illustrated in FIG. 14.

DETAILED DESCRIPTION OF THE INVENTION

Turning now to FIG. 1, there is illustrated a shaving unit 10, which will be described in greater detail hereinafter, and for present purposes it is sufficient to indicate that it includes an instrument means or handle means 12 adapted to be held by the user in a conventional manner, with a shaving member or blade 13 to be ultrasonically vibrated and mounted therein. Extending from one end thereof is supply means 14 which supplies to the instrument means 12, power from generator or power means 15 having an electrical cord 16 connected to a plug 18 adapted to be plugged into a 60 cycle per second outlet. Switching means 20 on the generator 15 includes a switch 22 for providing power for energizing the ultrasonic transducer or motor 25 contained within the instrument casing or housing means 26 of the hand held instrument 12. The energy from the generator 15 is transmitted to the ultrasonic motor by wires 23 and 24 extending through the flexible conduit 28 of the supply means 14. The power transmitted by the generator 15 to the instrument 12 may be varied by control knob 29 extending beyond the front panel 30 of the cabinet 32. The power control knob 29 is adjusted by the user of the unit to adjust to his hair growth or beard and particular needs. For example, if the individual has a light beard or hair growth then a lower power setting might be selected, and if it is a heavy beard or hair growth then a larger power setting may be selected. Obviously, the unit 10 is for use by both males and females.

The complete assembly for use in the home includes the generating means 15, for example, a transistorized oscillator capable of producing electrical oscillation at a frequency in the ultrasonic range, defined herein to include vibrations in the range of 5,000 to 1,000,000 cycles per second, but generally between 16,000 and 100,000 cycles per second. Various types of such oscillators are known and it is not believed necessary to describe the details herein. In practice the generator 15 may be as small as 5 or 10 watts and generally in the range of 5 to 30 watts, and is preferably of the solid state type. Although the oscillation generator 15 may be manually tuned to the resonance frequency of the mechanically vibrating unit, it is desired to employ an oscillation generator, as described above, which automatically adjusts to the resonant frequency by reason of the changes occurring in the latter as the shaving member 13 is driven and engages the hairs of the human being shaved. Such changes in the resonant frequency of the mechanically vibrating unit occur by reason of the fact that the natural frequency of the blade 13 will vary with the load placed upon it which might be water, shaving cream or physical engagement with hairs.

FIGS. 2 and 3, illustrate somewhat schematically the portion of the ultrasonic instrument 10 with respect to the skin 32 and hairs 33 that are removed by the cutting edge 35 of the blade 13 adjacent the skin surface 34. The instrument or first member 12 includes supporting means 40 for supporting the shaving member 13, which is illustrated in the form of double edge razor, and which clamps the blade 13 in place in a relatively fixed position without substantially acoustically loading or damping the same. The supporting means 40 includes a spider and cap assembly, indicated generally at 41 and a blade seat assembly 42. In addition guard means or assembly 44 is provided including a guard member 45 which is adapted to move relative to the blade memebr 13 to vary the spacing therebetween and hereinafter discussed in FIGS. 4–9 in greater detail.

The ultrasonic energy available at the cutting edge 35 of the blade 13 provides several beneficial results. It has been found that, by reason of the vibrations at the cutting edge 35, which vibrations may be in a substantially vertical plane, that is, in a plane perpendicular to the plane of the cutting edge 35, the resistance of the blade member 13 across the skin surface 34 is very substantially reduced. The friction reduction effects and the cutting ease may be obtained by the vibrations having an elliptical, orbital, longitudinal or flexural component of motion at the cutting edge 35. A possible explanation of this observed phenomenon is that the extremely high acceleration of the cutting edge 25 of shaving member 13 resulting from the vibrations causes only a relatively small sliding friction to be present between the engaged skin surface 34 and the shaving member 13. Thus, even though the shaving member 13 is essentially stationary with no gross movement the acceleration forces not only reduce the friction but successively subject the hair portions 33 extending from the skin 32 to the cutting action of the cutting edge at a repetition rate of from 5,000 to 1,000,000 times per second and thus provide a continuous severing of the hairs at or adjacent to the surface 34 of the skin 32.

The frequency of the vibrations at the free end portion of blade member 13 may be in the range from 5,000 cycles per second to 100 kilocycles per second, and preferably in the range from 16 to 80 kilocycles per second, while the amplitude of the vibrations is selected within the range from approximately .0001 to .025 inch so as to ensure the introduction of vibratory energy sufficient to perform the cutting of the hair particles and maintain the friction reduction qualities.

Thus, the vibratory energy applied at a suitable frequency, to the blade produces vibratory motion of the molecular structure of such blade so that the surface of blade 13 is continuously maintained at a state of motion relative to the surface 34 of the skin 32, whereby the frictional resistance of movement of the shaving member 13 to the surface is determined by the kinetic coefficient of friction therebetween rather than by the substantially larger static coefficient of friction between the material of the shaving member 13 and the skin 32. The ultrasonic energy at the cutting edge 35 also provides for the increased life of a blade since the tendency to wear is substantially reduced by the effects of the high frequency mechanical vibrations present at the free cutting ends thereof. The ultrasonic shaving instrument 10 also permits a closer shave to be obtained due to the inherent characteristics of a vibratory member which when vibrated in the ultrasonic frequency range as herein defined will vibrate with an acceleration of at least 1,000 g's such that the time of contact between the cutting edge 35 and the surface 34 of the skin 32 is minimal even when a static force is applied by the user against the skin.

It is to be noted that the manner in which vibrations are transmitted to the blade 13 may be achieved in various ways, as by contact of the transmission member 46 with the blade 13, as seen in FIG. 5, in which case there is no rigid attachment or coupling of the blade 13 to the transducer 25. Other ways of mounting the blade and coupling the ultrasonic mechanical vibrations thereto are hereafter discussed with respect to FIGS. 10–13.

Referring now to FIGS. 4 through 9, there is shown in detail the ultrasonically driven shaving implement 10 in accordance with the present invention, certain components of which may be of a standard type shaving implement, as for example, that illustrated in U.S. Pat. No. 3,358,368.

Referring to FIG. 4, which illustrates the parts in exploded relation we have the supporting means 40 for the blade 13 which may be formed as part of the spider and cap assembly 41 and seat 42 which co-act together as hereinafter described to clamp the blade 13 in a relatively fixed position while simultaneously permitting the ultrasonic energy to be transmitted thereto and without damping out same. The guard assembly 44, adjusting knob 48, and index ring 47 adapted to fit around the adjusting knob 48. Also included is a tubular handle 50, coil spring 51 adapted to be received in the handle 50, bearing assembly 52 and operating knob 53, joined to the spider stem by a rivet washer 55 and covered by a trim cap 56. A cam follower 57 is shown positioned below the lower end of the blade seat assembly 42 and upper end of the guard assembly 44. A rivet 58 shown to the immediate left of the tubular handle 50, serves to join the handle and guard member in a manner to become apparent. The ultrasonic motor 25, hereinafter discussed in greater detail, includes a motor insert or transducer 36 comprised of a transmission member 46 and a stack 37 of magnetostrictive laminations which is adapted to telescopically fit within coil 38 which is retained in position within the hollow spider stem 60 by means of spaced apart washers 39 and 49.

The spider cap assembly 41 includes a hollow spider stem 60 adapted to retain the ultrasonic motor 25 and having threads 61 formed at its lower end with a spider body 64 of known form mounted on the upper end. Cap sections 65 and 66 are pivotally supported on transverse spider arms 68 and 69 at opposite ends of the spider body 64. The cap sections 65 and 66 are of identical construction and include downwardly projecting arms 70 and 71 which facilitate pivotal mounting in the manner described. A more detailed description of the construction of the spider and cap assembly may be had in the U.S. Pat. No. 3,293,744.

The blade seat assembly 42 consists of a blade seat member 73 joined to a tubular seat mounting member 74. An opening 75 is formed in the seat mounting member 74 for reasons to become apparent. The blade seat member 73 is provided with spider guide grooves 76 and 77 which accommodate the downwardly extending ends of the spider body 64 and guidingly engage it as it is elevated and lowered during adjustment of the blade clearance as well as during opening and closing of the cap sections 65 and 66.

The supporting means or clamping means 40 includes one or more projections members or ribs 81 extending from cap sections 65 and 66 and the blade seat member 73 is likewise provided with complementary ribs 82 which as seen with respect to FIGS. 5 and 9 form the blade seat with minimal cross-sectional area during clamping by the cap sections to prevent acoustically loading the blade 13. The ribs 81 and 82 vary in shape, configuration and material depending on the power rating of the generator used in conjunction with the instrument 12. The ribs 81 and 82 may be formed of an acoustically isolating or absorbing material such as certain rubbers and plastics such that the vibratory energy is not transmitted to the remaining portions of the instrument 12.

The guard assembly 44 includes a guard member 45 joined to a tubular mounting neck 86. As best seen in FIGS. 4 and 5, the guard member 45 includes a main body 87 having guard bar portions 88 and 89 at opposite margins. Elongated slots 90 are provided intermediate the body 87 and the guard bar 88 while similar slots 91 are formed intermediate the guard bar 89 and the body 87, both of which function to permit the shaving product to flow beneath the guard member during the shaving operation. At opposite ends of the body 87 is provided elongated slots 93 and 94 which receive the downwardly projecting arms on the spider body 64, to maintain the parts properly oriented during shaving, adjustment and opening and closing of the cap sections.

On opposite sides of the guide slots 93 and 94 are formed guide slots 96 and 97, 98 and 99, respectively. These slots guidingly engage the pivot arms on the cap sections 65 and 66 and also engage a flange (not shown in FIG. 4) on the lower end of each pivot arm as the spider and cap assembly 41 is elevated, thereby to cause opening and closing of the cap sections 65 and 66. The opening and closing of the cap occurs only on substantial shifting of the spider relative to the guard member, the caps remaining tightly closed during adjustment.

The tubular mounting neck 86 is provided with an enlarged portion 102 at the upper end and a portion of smaller diameter at the lower end. Elongated slots 103 and 104 are formed in the enlarged tubular portion 102 and extend downwardly into the tubular portion of reduced diameter. The lower end of the tubular mounting neck 86 is fastened to the handle 50 by the rivet 58 and opening 75 and the seat mounting member is large enough to permit shifting between the two.

The cam follower 57 includes a tunular body portion 105 having outwardly projecting cam track engaging portions 106 and 107 disposed at the lower end portions thereof. The cam track engaging portions 106 and 107 are slidably received in the slots 103 and 104 and move upward and downward in response to rotation of the adjusting knob 48. The cam track engaging portions 106 and 107 may be positioned in the slots 103 and 104 before the mounting neck is joined to the guard member 45, so that the cam follower 57 will be permanently assembled to the blade seat assembly 42.

The manner in which the biasing force is transmitted from the lower end of the handle to the cam follower is best understood with reference to FIG. 6, in which the lower end of the handle 50 and operating knob are shown assembled and in cross-section. The lower end of the blade seat mounting member 74 is joined to the bearing collar 52. An enlarged circumferentially raised portion 115 having a frusto-conical surface 116 at one end and an abrupt shoulder 117 at the opposite end is formed on the outer periphery of the bearing 52. The operating knob 53 has a counterbore 118 provided with an annular groove 119 of sufficient width to receive the raised portion 115 on a bearing assembly 52. Suitable threads 120 are formed in a bore of reduced diameter in the operating knob 53.

The upper end of the bearing 52 serves as an abutment for the spring 51 which is received in a counterbore 121 and bottomed on the opposite end against a shoulder 122 in the handle 50. The spring 51 urges the bearing assembly 52 away from the handle 50 thereby constantly urging mounting member 74 downwardly, whereby the upper end portion described above will resiliently urge the cam followers into engagement with the cam tracks 111 and 112.

The operating knob is maintained in threaded engagement with threads 61 on the lower end of the spider stem 60 by washer 55 which is riveted or otherwise suitably attached to the lower end of the spider stem 60. The washer 55 is carried with the stem and moves into an enlarged bore 123 formed in the lower end of the knob 53. A radial shoulder 124 is formed at the bottom of the enlarged bore and terminates at the threads 120. The washer 55 has an axial bore 125 extending therethrough to accommodate the conduit 28 of the supply means 14, which has an enlarged head 126 to prevent the conduit from slipping through the axial bore 125. The washer 55 contains an annular inner threaded portion 127 which mates with the threaded portion 61 of the spider stem 60 to obtain a rigid coupling therebetween. When the cap sections 65 and 66 are in the fully opened position the washer 55 engages the shoulder 124 to prevent further upward travel of the spider stem 60. A trim cap 56 may be knurled or the like at its upper end and press fitted into the lower end of the counterbore 123 to prevent ingress of foreign matter into the area of the threads and also to lend a finished appearance to the assembly. An axial bore 130 is provided to accommodate the conduit 28.

The ultrasonic motor 25, as seen best in FIGS. 4, 5 and 6 includes an elongated member or acoustic element 36 and a coil 38 for receiving the insert or second member 36 therein, the acoustic element 36 is positioned within a vertically extending passageway 130 which extends the axial length of the spider stem 60, and the stack 37 is fabricated of a plurality of individual magnetostrictive strips and held tightly in stacked relation such as by rivets (not shown) extending therethrough. In view of the relative dimensions of the magnetostrictive portion 37, it will be seen that upon insertion in a suitably oriented magnetic field, a significant elongation of the stack 37 will occur. Consequently, upon application thereto a magnetic field from the coil 38 whose magnitude varies, the length of the stack 37 will similarly vary. In accordance with known principles, the magnetostrictive stack 37 is preferably made to be of a length equal to an integral number of half-wavelengths in the material at the driving frequency. In this manner, maximum conversion of energy from the magnetic field to mechanical vibration is achieved. It will be appreciated that other forms of electrical to mechanical transducers e.g. piezoelectric, ferrites, may also be employed in accordance with the present invention.

Rigidly affixed to one end of the magnetostrictive element 37, such as by welding, is the connecting or transmission member 46. This member may be formed of any suitable material capable of supporting vibrations transmitted thereto from the magnetostrictive stack and many metals and hard plastics are suitable for this purpose. However, to operate most efficiently, the connecting member 46 should be made equal in length to an integral number of half-wavelengths in the material at the frequency of vibration. A suitable material enabling the length of the connecting member 46 to be maintained within reasonable limits is Monel, but it will be understood that other materials may also be used.

The forward end of transmission member 46 is provided with a groove or slot 132 so as to provide a pair of elements or fingers 129 suitably provided as by contouring their output surfaces 131 to engage the blade 13 in energy transferring relation thereto such that the longitudinal vibrations in the connecting body may be transmitted unimpeded to the blade 13 and consequently to the edge 35. The amplitude of the vibrations transmitted to the blade by transmission member 46 may be suitably varied by changing the proportion of the masses of the sections thereof, or even by providing a transmission member input section so that the amplitude of the vibrations transmitted to the blade member is smaller than the amplitude of the vibrations received by transmission member from transducer.

Preferably, the connecting member 46 is formed to produce at its output end or tip 131, which includes a groove 132 to extend around the spider body 64, an amplification of the longitudinal vibrations applied to its input end by the magnetostrictive member 37. To effect this function, the member 46 is formed in two sections of differing area. The transition at the bottom 133 of the groove 132 from the larger to the smaller cross-sectional area is preferably at a nodal point of vibration, that is, a point along the member 46 wherein longitudinal motion is a minimum. In a uniform diameter element one-half wavelength long, such a node would occur at the quarter-wave point, half way between the ends. By locating the transition point at a nodal plane, proper acoustic impedance transformation takes place and an increased longitudinal amplitude of vibration is obtained at the output end 131.

The acoustic element 36 is rigidly fixed to the passageway 130 by mounting means which may be in the form of a pair of spaced apart O-rings 134 such that the vibratory energy obtained therein is not transmitted to the spider stem 60 and in turn the instrument 12 when held by the user. By this means, longitudinal vibrations in the connecting body may be transmitted unimpeded to the blade 13 and consequently to the edge 35 thereof. One or more peripheral grooves 135 are provided on section 46 near the nodal point of the transducer for the O-rings 134 which extends within the accommodating recesses 135 provided in the inner wall surface of the stem 60. Due to the poor sonic transmission qualities of the resilient O-rings which may be made of rubber, and their location, there is negligible energy coupling to the stem 60 and the acoustic element 36 is acoustically isolated from the instrument. Surrounding the magnetostrictive stack 37 is the coil 38 in surrounding relation thereto and which may be retained in fixed position by the pair of rings 39 and 49 extending into the stem 60. The ends of the coil 38 are brought out through wires 23 and 24 that extend through the bearing assembly 52 and trim cap 56 and contained within the flexible conduit 28 which is connected to the generator 15. The flexible conduit 28 has an enlarged head portion 126 to prevent it from being removed from the instrument 12. The portions of the instrument surrounding the coil 28 is preferably of electrically insulating material such as plastic, for greater efficiency of the unit.

As heretofore explained for use in the home unit 10 could include, in addition to the apparatus disclosed in FIGS. 4 through 9, a suitable source of alternating electrical energy and D.C. polarizing current. Such a source would include, for example, the generator 15 which may be a transistorized oscillator capable of producing electrical oscillation at a frequency in the ultrasonic range e.g., between 5,000 and 1,000,000 c.p.s. Various types of such oscillators are known and it is not believed necessary to describe the details herein.

Electrical oscillations and direct current from the source are coupled via the wires 23 and 24 to the coil 38 in the stem 60. There is thus established in the passageway 130 of the handle a magnetic field whose magnitude changes at an ultrasonic rate. The magnetostrictive portion 37 of the acoustic element 36 is positioned within the magnetic field and in well known manner, provides a mechanical longitudinal vibration at the frequency of the magnetic field. This vibration is transmitted via the connecting member 46 to the blade 13 and the blade edge 35. Since the stem 60 is isolated by the O-rings 134 from the longitudinal motion of magnetostrictive stack 37 and the connecting member 46, no vibrations are coupled therethrough and no damping thereof occurs when the assembly is held in the hand of the user.

Furthermore, inasmuch as relatively low power is required and the average shaving procedure takes only a matter of minutes, the heat generated in the magnetostrictive stack 37 is insufficient to cause any damage to the apparatus itself or to provide any discomfort to the user. The diameter of the conductor used for the coil 38 is made relatively large to minimize heat generation resulting from $I^2R$ losses.

The razor illustrated in FIGS. 4–9 may be prepared for use by inserting a conventional double edge razor blade 13 capable of transmitting ultrasonic vibrations. The operating knob 56 is then rotated to close the sectional caps 65 and 66, clamping the blade 13 by the supporting means 40 with the ribs 81 and 82 retaining the blade 13 in position and bringing the blade 13 into energy transferring relation to the ultrasonic motor 25 by maintaining a static force between the output surface 131 and the blade 13. The switch 22 of the control means 20 on the generator 15 may then be turned on and the power control knob 29 may be adjusted depending upon the habits of the user. The blade 13 is then caused to vibrate at an ultrasonic rate with flexural vibrations as indicated by arrow 31 and ready for use. The desired degree of blade clearance relative to the guard bars 88 and 89 may be obtained by rotation of the adjusting knob 48. Such rotation causes the track-engaging portions 106 and 107 of the follower 57 to follow the contour of the cam tracks 111 and 112. This causes a change in the elevational position of the blade seat 73 relative to the fixed guard bars 88 and 89, varying the clearance to permit the shaver to select the desired degree of clearance most satisfactory to his skin and beard and providing for maximum shaving comfort.

FIGS. 10–13 illustrate schematically other embodiments of the invention pertaining primarily to the mounting of the blade and means for ultrasonically vibrating same. FIG. 10 illustrates a form in which retaining means 140a is provided in the form of pockets or indentations 141a contained in the upper and lower surfaces of the blade 13a to accommodate the ribs 81a projecting from the cap sections 65a and 66a, and the ribs 82a projecting from the blade seat member 73a. Due to the friction reduction effect the retaining means 140a in the form of indentations 141a provides a positive retention against gross movement of the blade 13a relative to the supporting means 40a. The ultrasonic energy is transmitted to the blade 13a by means of the ultrasonic motor 25a transmitting longitudinal vibrations as indicated by arrow 43a, or torsional, elliptical or other vibrational energy. This ultrasonic vibratory energy is then transmitted through the blade 13a to obtain flexural vibrations as indicated by arrow 31a at the blade edges 35a.

FIG. 11, illustrates an embodiment in which the blade 13b is mounted by supporting means 40b including one or more upper ribs 81b and lower ribs 82b to obtain the blade 13b in a fixed position. The vibratory energy is introduced by a pair of spaced apart transmission members 46b vibrated in the direction of arrow 43b to obtain the flexural vibration in the direction of arrow 31b.

FIG. 12, illustrates another embodiment in which a blade 13c having a single cutting edge 35c is retained by supporting means 40c in position by ribs 81c and 82c and flexural vibration, 31c is obtained by means of the motor 25c vibrating in the direction of arrow 43c against the blade 13c.

FIG. 13, illustrates another embodiment in which the supporting means 40d includes the ribs 81d and 82d for mounting the blade 13d, and in this form positive coupling means 145d is employed to mechanically join the blade 13d to the motor 25d. The coupling means 145d may be in the form of a threaded fastener 146d with a washer 147d between the head of the screw and the blade 13d, in this manner the longitudinal vibrations 43d are transmitted to the blade 13d resulting in the lateral vibrations 31d. A rivet or other coupling member may also be used to provide the necessary joinder of the blade and motor. Since the motor insert may be designed to be removed from the instrument it may be permanently joined to the blade such that when the blade edge is no longer sharp it may be disposed of with the motor insert and replaced with a new one.

FIGS. 14 and 15, illustrate another embodiment 12e of the invention in which a piezoelectric ultrasonic motor 25e is utilized to drive the razor blade 13e to obtain the flexural or other vibrations 31e at the cutting edge 35e.

Referring to FIG. 14, which illustrates the parts in exploded relation we have the supporting means 40e for the blade 13e which may be formed as part of the spider and cap assembly 41e and seat 42e which co-act together as hereinafter described to clamp the blade 13e in a relatively fixed position while simultaneously permitting the ultrasonic energy to be transmitted thereto and without damping out same. The guard assembly 44e, adjusting knob 48e, and index ring 47e are adapted to fit around the adjusting knob 48e. Also included is a tubular handle 50e, bearing assembly 52e and operating knob 53e, joined to the spider stem by a rivet washer 55e and covered by a trim cap 56e. A cam follower 57e is shown positioned below the lower end of the blade seat assembly 42e and upper end of the guard assembly 44e. A rivet 58e shown to the immediate left of the tubular handle 50e, serves to join the handle and guard member in a manner to become apparent. The ultrasonic motor 25e, hereinafter discussed in greater detail, includes two piezoelectric wafers 149e and 150e separated by an aluminum or other metallic disk electrode 151e. The wafer 150e is directly connected to a back plate 152e. The wafer 150e is directly connected to a back plate 152e which may constitute the other electrode.

The spider cap assembly 41e includes a hollow spider stem 60e adapted to have the electric leads extend therethrough and having threads 61e formed at its lower end with a spider body 64e of known form mounted on the upper end. Cap sections 65e and 66e are pivotally supported on transverse spider arms 68e and 69e at opposite ends of the spider body 64e. The cap sections 65e and 66e are of identical construction and include downwardly projecting arms 70e and 71e which facilitate pivotal mounting in the manner described. A more detailed description of the construction of the spider and cap assembly may be had in the U.S. Pat. No. 3,293,744.

The blade seat assembly 42e consists of a blade seat member 73e removably joined to a tubular seat mounting member 74e. An opening 75e is formed in the seat mounting member 74e for reasons to become apparent. The blade seat member 73e is provided with spider guide grooves 76e and 77e which accommodate the downwardly extending ends of the spider body 64e and guidingly engage it as it is elevated and lowered during adjustment of the blade clearance as well as during opening and closing of the cap sections 65e and 66e.

The supporting means 40e includes one or more projections or ribs 81e extending from cap sections 65e and 66e and the blade seat member 73e is likewise provided with complementary ribs 82e which as seen with respect to FIG. 15 form the blade seat with minimal cross sectional area during clamping by the cap sections to prevent acoustically loading the blade 13e. The ribs 81e and 82e are in spaced relation to each other to permit the flexing of the blade. The ribs 81e and 82e may be formed of an acoustically isolating or absorbing material such as certain rubbers and plastics such that the vibratory energy is not transmitted to the remaining portions of the instrument 12e.

The guard assembly 44e includes a guard member 45e joined to a tubular mounting neck 86e and a main body 87e having guard bar portions 88e and 89e at opposite margins. Elongated slots 90e are provided intermediate the body 87e and the guard bar 88e while similar slots 91e are formed intermediate the guard bar 89e, and the body 87e both of which function to permit the shaving product to flow beneath the guard member during the shaving operation. At opposite ends of the body 87e is provided elongated slots 93e and 94e which receive the downwardly projecting arms on the spider body 64e, to maintain the parts properly oriented during shaving, adjustment, and opening and closing of the cap sections.

On opposite sides of the guide slots 93e and 94e are formed guide slots 96e and 97e, 98e and 99e respectively. These slots guidingly engage the pivot arms on the cap sections 65e and 66e and also engage a flange (not shown in FIG. 14) on the lower end of each pivot arm as the spider and cap assembly 41e is elevated, thereby to cause opening and closing of the cap sections 65e and 66e. The opening and closing of the cap occurs only on substantial shifting of the spider relative to the guard member, the caps remaining tightly closed during adjustment.

The tubular mounting neck 86e is provided with an enlarged portion 102e at the upper end and a portion of smaller diameter at the lower end. Elongated slots 103e and 104e (FIG. 15) formed in the enlarged tubular portion 102e and extend downwardly into the tubular mounting neck 86e is fastened to the handle 50e by the rivet 58e and opening 75e in the seat mounting member is large enough to permit shifting between the two.

The cam follower 57a includes a tubular body portion 105e having outwardly projecting cam track engaging portions 106e and 107e disposed at the lower end portions thereof. The cam track engaging portions 106e and 107e are slidably received in the slots 103e and 104e and move upward and downward in response to rotation of the adjusting knob 48e. The cam track engaging portions 106e and 107e may be positioned in the slots 103e and 104e before the mounting neck is joined to the guard member 45e so that the cam follower 57e will be permanently assembled to 42e.

The manner in which the biasing force is transmitted from the lower end of the handle to the cam follower is best understood with reference to FIG. 15, in which the lower end of the handle 50e and operating knob are shown assembled and in cross-section. The lower end of the blade seat mounting member 74e is joined to the bearing collar 52e. An enlarged circumferentially raised portion 115e having a frusto-conical surface 116e at one end and an abrupt shoulder 117e at the opposite end is formed on the outer periphery of the bearing 52e. The operating knob 53e has a counterbore 118e provided with an annular groove 119e of sufficient width to receive the raised portion 115e on a bearing assembly 52e. Suitable threads 120e are formed in a bore of reduced diameter in the operating knob 53e.

The upper end of the bearing 52e serves as an abutment for the spring 51e which is received in a counterbore 121e and bottomed on the opposite end against a shoulder 122e in the handle 50e. The spring 51e urges the bearing assembly 52e away from the handle 50e thereby constantly urging mounting member 74e downwardly whereby the upper end portion described above will resiliently urge the cam followers into engagement with the cam tracks 111e and 112e.

The operating knob is maintained in threaded engagement with threads 61e on the lower end of the spider stem 60e by washer 55e which is riveted or otherwise suitably attached to the lower end of the spider stem 60e. The washer 55e is carried with the stem and moves into an enlarged bore 123e formed in the lower end of the knob 53e. A radial shoulder 124e is formed at the bottom of the enlarged bore and terminates at the threads 120e. The washer 55e has an axial bore 125e extending therethrough to accommodate the conduit 28e of the supply means 14e which has an enlarged head 126e to prevent the conduit from slipping through the axial bore 125e. The washer 55e contains an annular inner threaded portion 127e which mates with the threaded portion 61e of the spider stem 60e to obtain a rigid coupling therebetween. When the cap sections 65e and 66e are in the fully opened position the washer 55e engages the shoulder 124e to prevent further upward travel of the spider stem 60e. A trim cap 56e may be knurled or the like at its upper end and press fitted into the lower end of the counterbore 123e to prevent ingress of foreign matter into the area of the threads and also to lend a finished appearance to the assembly. An axial bore 130e is provided to accommodate the conduit 28e.

The ultrasonic motor 25e as seen best in FIG. 15 includes two piezoelectric wafers 149e and 150e separated by an aluminum disk electrode 151e. The wafer 150e is directly coupled to a back plate 152e which may constitute the other electrode. The front end of the motor assembly is formed by the blade seat member 73e which has the ribs 82e extending from its upper surface.

The front end of the mounting member 74e is provided with a threaded portion 154e which terminates in a radial shoulder 155e having apertures 156e extending therein to permit the wires 23e and 24e to extend therethrough and extend through the axial passageway 130e and then through conduit 28e to the generator. Lead 23e is connected to electrode 151e and lead 24e to plate 152 in a conventional manner. Sleeve 157e of an insulating material extends around the threads 154e and the axial length of wafer 149e, electrode 151e and wafer 150e. The back plate 152e and blade seat member 73e may both be threadably engaged with the threaded portion 154e and held together by a nut 158e. Insulated O-rings may be used as required to isolate the vibrations. The vibratory energy of the seat 73e is transmitted to the ribs 82e which are transmitted to the blade 13e and over to the spacing between the ribs 82e and 81e. The flexural vibrations are obtained at the cutting edge 35e as indicated by arrow 31e.

CONCLUSION

From the foregoing, it will be evident that the application of ultrasonic energy to skin surfaces is effective to provide a significantly improved shaving action. In accordance with the present invention, relatively small amplitude vibrations are employed to drive a blade or razor member which may be in the form of a conventional razor made up of a material capable of transmitting ultrasonic vibrations. The instrument is perfectly safe, whereby it may be regularly employed by men and women throughout the world without any special training or skill.

The reduction of the coefficient of friction and minimal contact between the skin and cutting edge provides for less irritation of the skin and permits the user to obtain a closer shave which is most important for individuals having a tough beard. In addition to the superior shaving action provided by the invention several auxiliary benefits of the ultrasonic action have been noted. The ultrasonic action also results in partial sterilization of bacteria-laden areas of the skin and provides for more intimate application of chemical or other agents that may be contained in a shaving cream employed by the user. The fluid film provided by the water or shaving cream may also provide a cleansing action to the skin.

It will be seen therefore, that in accordance with the invention a method of utilizing ultrasonic energy for improved shaving is provided, together with a novel form of apparatus by means of which the process may be carried out. Although only a few general forms of the latter has been illustrated, it will be recognized that many modifications thereof may be made without departing from the spirit of the invention. For example, the shape and configuration of the ultrasonic motor may be changed radically from that shown and different forms of coupling of the energy to the blade may be provided. Moreover, the handle member may be enlarged to accommodate a transistorized oscillatory power supply instead of merely including a connection to an external source. In addition the blade and acoustic element may take various configurations, such that both are purchased together and thereafter disposed of as a unit. This is possible due to the extended life of the edge of the blade. In addition the blade may be mounted in a shaving instrument in which the blade is rotated or oscillated in a maner as is presently the case in electric shaving instruments, but at the same time ultrasonically vibrated in accordance with the present invention.

I claim:
1. A method of shaving hair, comprising the steps of
   (A) positioning adjacent the hair to be shaved, a shaving member having a cutting edge capable of supporting vibrations in the ultrasonic range,
   (B) inducing vibrations in said shaving member having a flexural component of motion at said cutting edge at a frequency in the ultrasonic range between 15,000 and 100,000 cycles per second,
   (C) maintaining an amplitude of vibration of said flexural component at said cutting edge sufficient to obtain a reduction of friction between the relative movement of the shaving member and the hair, and
   (D) moving said ultrasonically vibrating shaving member relative to the hair to engage the cutting edge therewith to obtain a severing thereof.

2. The method as defined in claim 1, and further including the step of maintaining said cutting edge in spaced relation to the skin surface.

3. The method as defined in claim 1, wherein said shaving member is manually moved relative to said skin surface.

4. The method as defined in claim 1, wherein said vibrations are induced in said shaving member in spaced relation to the cutting edge thereof and in a plane substantially normal to the surfaces thereof.

5. The method as defined in claim 4, wherein said shaving member has a pair of parallel spaced apart cutting edges and said vibrations are induced therein between said edges.

6. The method of shaving hair, comprising the steps of
   (A) mounting a shaving member having a cutting edge in a shaving instrument in a relatively fixed position without acoustically loading the same, said shaving member being capable of supporting vibrations in the ultrasonic range,
   (B) positioning adjacent the hair to be shaved the cutting edge of said shaving instrument,
   (C) inducing vibrations in said shaving member at a frequency in the ultrasonic range between 15,000 and 100,000 cycles per second to vibrate said cutting edge with a flexural component of motion and said vibrations being substantially retained in said shaving member,
   (D) maintaining an amplitude of vibration at said cutting edge sufficient to obtain a reduction of friction between the relative movement of the shaving member and the hair, and
   (E) moving said shaving instrument relative to the surface of the skin to obtain a transmission of said vibratory motion from said cutting edge to the hair to obtain a severing thereof.

7. The method as defined in claim 6, and further including the step of maintaining said cutting edge in spaced relation to the skin surface.

8. The method as defined in claim 6, wherein said vibrations are induced in said shaving member in spaced relation to the cutting edge thereof and in a plane substantially normal to the surface thereof.

9. The method as defined in claim 6, wherein said shaving member has a pair of parallel spaced apart cutting edges and said vibrations are induced therein between said edges.

10. The method as defined in claim 6, wherein said vibrations at said edge have a component of motion substantially normal to the opposite parallel surface thereof.

11. The method as defined in claim 6, wherein said shaving member is mounted without acoustically loading same by supporting ribs having minimal cross-sectional areas in contacting relation with opposite sides thereof.

12. The method as defined in claim 11, wherein said shaving member has accommodating recesses to receive said ribs.

13. The method as defined in claim 12, wherein said vibration is induced in said shaving member between said ribs.

14. Apparatus for use in shaving, comprising:
   (A) a shaving member capable of supporting vibrations in the ultrasonic range and having at least one edge for engagement with a surface to be shaved,
   (B) means adapted to be held in the hand for generating mechanical vibrations at an ultrasonic rate,
   (C) means in said vibration generating means for supporting said shaving member and inducing ultrasonic vibrations between 15,000 and 100,000 cycles per second therein to obtain a flexural component of vibration at said cutting edge, and at an amplitude of vibration at said cutting edge sufficient to obtain a reduction of friction between the relative movement of the shaving member and the surface to be shaved, and
   (D) means for removably coupling said shaving member to said means for generating mechanical vibrations, wherein said shaving member may be readily replaceable.

15. Apparatus as defined in claim 14, and further including means in said vibration generating means for supporting said shaving member with minimal loading thereof so as to permit the transmission of the ultrasonic vibrations to the shaving member edge without substantial damping of said vibrations.

16. Apparatus as defined in claim 15, wherein said means includes at least one pair of ribs adapted to engage opposite sides of the shaving member with minimal contact area to apply a minimum loading effect thereon.

17. Apparatus as defined in claim 14, and further including means in said vibration generating means for acoustically insulating said means adapted to be held in the hand, whereby the vibratory motion remains isolated therefrom and is not transmitted to the hand of the user.

18. Apparatus as defined in claim 14, wherein said means adapted to be held in the hand for generating mechanical vibrations at an ultrasonic rate includes:
   (a) an elongated member formed at least in part of a magnetostrictive material,
   (b) a member adapted to be held in the hand and including coil means for creating an alternating magnetic field at the frequency of alternating signals applied thereto,
   (c) means to mount said elongated member within said member and in energy transferring relationship to said shaving member whereby upon application of alternating current signals to said coil, said elongated member is mechanically vibrated in a longitudinal direction and vibrations are induced in said shaving member.

19. Apparatus as defined in claim 18, and further including means to rigidly couple said shaving member to one end of said elongated member.

20. Apparatus as defined in claim 14, wherein said means for generating mechanical vibrations includes magnetostrictive means.

21. Apparatus as defined in claim 14, wherein said means for generating mechanical vibrations includes piezoelectric means.

22. Apparatus as defined in claim 21, wherein said piezoelectric means includes:
   (a) a pair of piezoelectric members,
   (b) an electrode sandwiched between said piezoelectric members,
   (c) a metallic member on opposite sides of each of said piezoelectric members, and
   (d) means clamping in axial alignment and in the following order said metallic member, one of said piezoelectric members, said electrode, the other of said piezoelectric members and said other metallic member.

23. Apparatus for use in shaving, comprising:
   (A) a shaving member capable of supporting vibrations in the ultrasonic range and having at least one edge for engagement with a surface to be shaved, (B) electroacoustic transducer means including
  (1) a first member adapted to be held in the hand to be supplied with alternating electric energy at a frequency in the ultrasonic range,
  (2) a second member responsive to alternating electrical energy to mechanically vibrate at the frequency of said energy, (C) means on said first member to removably support said shaving member, wherein said shaving member may be readily replaceable, (D) means for coupling said second member in energy transmission relationship to said shaving member, (E) said second member converting the electrical energy supplied to said first member into mechanical vibrations between 15,000 and 100,000 cycles per second when received therein, whereby ultrasonic vibrations are induced in said shaving member at said edge, to obtain a flexural component of vibrations at said cutting edge, and at an amplitude of vibration at said cutting edge sufficient to obtain a reduction of friction between the relative movement of the shaving member and the surface to be shaved.

24. Apparatus as defined in claim 23, and further including vibration clamping means clamping said shaving member to said first member without acoustically loading the same.

25. Apparatus as defined in claim 23,
(a) wherein said second member includes an elongated member formed at least in part of a magnetostrictive material,
(b) wherein said first member includes coil means for creating an alternating magnetic field at the frequency of alternating current signals applied thereto, said magnetostrictive portion of said first member is disposed in said magnetic field, whereby upon application of alternating current signals to said coils, said elongated member mechanically vibrates in a longitudinal direction and vibrations are induced in said shaving member.

26. Apparatus as in claim 23, and further including means to rigidly couple said shaving member to said first member.

27. An adjustable safety razor of the double edge type comprising:
(A) a tubular handle,
(B) razor blade clamping means carried by said tubular handle, said razor blade clamping means including a blade supporting seat member having a mounting portion extending into said tubular handle and a pair of cap sections co-operating with said blade supporting member to removably clamp a razor blade to said blade supporting seat member, wherein said razor blade may be readily replaceable,
(C) a guard member positioned below said blade supporting seat member,
(D) means to incrementally vary the distance between said guard member and said clamper razor, and
(E) vibration generating means operatively associated with said tubular handle for supporting said razor blade and including ultrasonic vibrations between 15,000 and 100,000 cycles per second therein to obtain a flexural component of vibrations at the razor blade cutting edge, and at an amplitude of vibration at said cutting edge sufficient to obtain a reduction of friction between the relative movement of the shaving member and the surface to be shaved.

28. Apparatus as defined in claim 27, wherein said means for generating mechanical vibrations includes piezoelectric means.

29. Apparatus as defined in claim 27, wherein said means for generating mechanical vibrations includes magnetostrictive means.

30. An adjustable safety razor as defined in claim 29, and further including:
(a) an elongated member formed at least in part of a magnetostrictive material extending within said tubular handle,
(b) coil means extending around said magnetostrictive material for creating an alternating magnetic field at the frequency of alternating signals applied thereto,
(c) vibration isolating means to mount said elongated member within said tubular handle without transmitting any substantial energy thereto, and one end of said elongated member being in energy transferring relationship to said razor, whereby upon application of alternating current signals to said coil, said elongated member mechanically vibrates in a longitudinal direction and vibrations are induced in said shaving member.

31. An adjustable safety razor as defined in claim 27, wherein said razor blade clamping means includes at least one pair of ribs on said blade supporting seat member for engaging one side of said razor and at least one rib on each of said cap sections for engaging the other side of said razor, said ribs having minimal contact area to permit the transmission of the ultrasonic vibrations to the razor without acoustically loading same.

32. An adjustable safety razor as defined in claim 31, wherein said razor is provided with rib seats to accommodate said ribs.

33. An adjustable safety razor as defined in claim 31, wherein said mechanical vibrations is transmitted to said razor between the spaced apart ribs.

34. An adjustable razor as defined in claim 27, wherein said means to incrementally vary the distance between said guard member and said clamped razor blade includes an adjusting knob having a portion thereof engaging said tubular handle to hold it against axial movement.

35. An adjustable razor as defined in claim 34, and further including:
(a) cam track means carried on said adjusting knob,
(b) cam follower means carried on said guard and engageable with said cam track means on said adjusting knob, and
(c) spring means urging said cam follower means against cam track means whereby said portion of adjusting knob will be urged against said handle, and one of said members being engageable with said cam follower means and shiftable in response to rotation of said adjustment knob.

36. Apparatus for use in shaving comprising:
(A) vibration generating means adapted to be held in the hand for producing mechanical vibratory energy in the ultrasonic frequency range,
(B) means for removably supporting a razor having at least one free edge with minimal loading so as to permit the razor to be readily replaceable and the transmission of ultrasonic vibrations to the free edge thereof without substantial damping of said vibrations, said supporting means including at least one pair of support members adapted to engage the razor on opposite sides thereof and having minimal contact area therewith to apply a minimum loading effect therein, and
(C) means coupling said mechanical vibratory energy of said vibration generating means to said razor for inducing ultrasonic vibrations between 15,000 and 100,000 cycles per second therein, to obtain a flexural component of vibrations at the razor cutting edge, and at an amplitude of vibration at said cutting edge sufficient to obtain a reduction of friction between the relative movement of the shaving member and the surface to be shaved.

37. Apparatus as defined in claim 36, wherein said means for generating mechanical vibrations includes piezoelectric means.

38. Apparatus as defined in claim 36, wherein said means for generating mechanical vibrations includes magnetostrictive means.

References Cited

UNITED STATES PATENTS

| | | | |
|---|---|---|---|
| 1,719,827 | 7/1929 | Aron | 30—45 |
| 2,659,968 | 11/1953 | Crisp | 30—45 |
| 3,145,311 | 8/1964 | Dickey | 310—8.6 X |
| 3,235,962 | 2/1966 | Greenly | 30—45 X |
| 3,293,745 | 12/1966 | Schrader | 30—60.5 |
| 3,335,443 | 8/1967 | Parisi et al. | 30—45 UX |
| 3,396,285 | 8/1968 | Minchenko | 310—8.6 X |
| 3,452,435 | 7/1969 | Holdt | 30—45 |
| 3,509,626 | 5/1970 | Mead | 30—45 |

JAMES M. MEISTER, Primary Examiner

U.S. Cl. X.R.

30—45; 83—701